United States Patent
Verma (10) Patent No.: US 6,785,273 B1
(45) Date of Patent: Aug. 31, 2004

(54) TRAFFIC ENGINEERING FOR AN APPLICATION EMPLOYING A CONNECTIONLESS PROTOCOL ON A NETWORK

(75) Inventor: Dinesh Chandra Verma, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,327

(22) Filed: Mar. 20, 2000

(51) Int. Cl.[7] .............................................. H04L 12/28
(52) U.S. Cl. ..................... 370/389; 370/389; 370/401; 370/351
(58) Field of Search ................................ 370/351, 355, 370/389, 392, 400, 401, 409, 399; 709/203

(56) References Cited

U.S. PATENT DOCUMENTS

| | | | | |
|---|---|---|---|---|
| 6,266,335 B1 | * | 7/2001 | Bhaskaran | .................. 370/399 |
| 6,560,236 B1 | * | 5/2003 | Varghese et al. | ............. 370/401 |
| 6,598,071 B1 | * | 7/2003 | Hayashi et al. | ............. 709/203 |

* cited by examiner

*Primary Examiner*—Douglas Olms
*Assistant Examiner*—Robert W. Wilson
(74) *Attorney, Agent, or Firm*—Louis P. Herzberg; David Aker (57) ABSTRACT

The present invention presents methods and apparatus supporting traffic engineering in a connectionless protocol network constituted by a core of plain routers, without dependencies on the underlying link protocol. The IP is used as an example of a connectionless protocol. It also enables a network operator to perform traffic engineering on a core network of plain routers supporting any connectionless protocol.

17 Claims, 10 Drawing Sheets

TRAFFIC ENGINEERING FOR AN APPLICATION EMPLOYING A CONNECTIONLESS PROTOCOL ON A NETWORK

FIELD OF THE INVENTION

The present application relates to the field of computer network traffic. It is more particularly directed to network traffic in which communication between applications occurs using a connectionless protocol.

BACKGROUND OF THE INVENTION

Traffic Engineering refers to the capability of sending packets along different paths on a network in order to obtain particular performance goals such as uniform traffic load distribution in the network. A uniform load distribution is useful for networks which are required to meet a desired level of service and/or are required to conform to specific service level agreements.

The Internet Protocol (IP) constitutes the bulk of network communication in the current age, and it would be beneficial if packets belonging to the IP protocol could be redirected as desired along different paths of the network. However, the basic IP protocol is not designed to permit traffic engineering in this manner. IP is a connectionless protocol which uses the destination address for forwarding packets. IP packets are routed solely based on their destination addresses. As a result, all packets that are destined to go a specific set of destination addresses are constrained to follow a fixed path in the network.

If there is enough capacity in the network, then the path taken by all the packets does not constitute a problem. However, there are many cases where the traffic on a specific path exceeds the capacity available on the path. As a result, it is quite common to experience network congestion and packet loss in an IP network. In many of these cases, an alternate path with extra capacity is available on the network. However, it is not possible to send packets on that path using the normal IP protocols.

In order to achieve traffic engineering, many traffic operators depend on other protocols such as Frame Relay (FR) or ATM to establish connections which can be routed in the network according to the capacity available in the network. ATM and FR are examples of connection-oriented protocols. The IP packets are then multiplexed onto the different ATM or Frame Relay connections. Another connection-oriented approach is the multi-protocol label-swapping (MPLS) approach. MPLS also depends on establishing connections at a layer below the IP layer.

While schemes such as building IP over ATM, Frame Relay or MPLS can be used as effective schemes for traffic engineering, they require the development and operation of a different network which effectively supersedes the IP network. These approaches are unable to work over IP networks which are built upon faster but different underlying link technologies. Another example is the fast Ethernet or the Gigabit Ethernet, which can form part of a network backbone, but does not use the connection oriented paradigm of ATM, FR or MPLS. Another problem associated with these approaches is that they require an extra layer of encapsulation of IP packets. The additional layering adds headers which can result in potential packet fragmentation, and reduced bandwidth.

SUMMARY OF THE INVENTION

Accordingly, an aspect of the present invention presents methods and apparatus by which traffic engineering is supported in a connectionless protocol network constituted by a core of plain routers, without dependencies on the underlying link protocol. The IP is used as an example of a connectionless protocol.

Another aspect of the present invention presents an apparatus for an access router with which a network operator can support traffic engineering on a core network of plain routers supporting a connectionless protocol.

BRIEF DESCRIPTION OF THE DRAWINGS

These and other aspects, objects, features, and advantages of the present invention will become apparent upon further consideration of the following detailed description of the invention when read in conjunction with the drawing figures, in which.

DETAILED DESCRIPTION OF THE INVENTION

Figure 1:
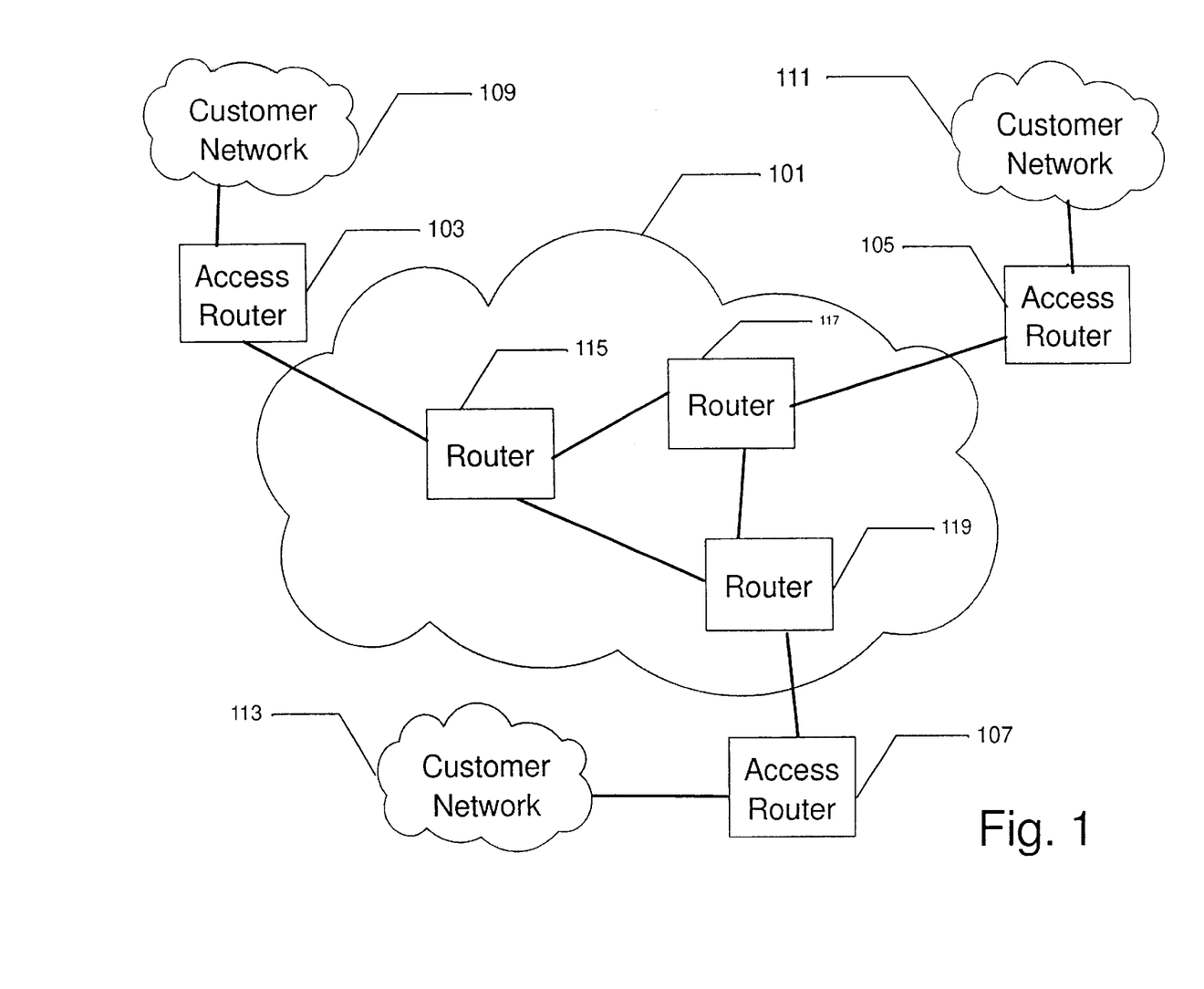
FIG. 1 shows a block diagram of an environment of an IP network deployed by a network operator.

FIG. 1 illustrates a typical environment for an ISP network. The network includes a core network 101 which is accessed by means of access routers 103, 105, 107 etc. The access routers connect the network provider to customer networks 109, 111, 113 etc. The core network itself includes several routers, 115, 117, 119, etc. The connectivity between different routers in the network is assumed to be provided using the IP protocol, i.e., all the routers support the IP protocol. However, the present invention is applicable to any connectionless router. A router is herein referred to as being a connectionless router if it supports a connectionless protocol. The IP protocol is an example of a connectionless protocol. Because of its prominence and general usage, it is used herein as the example protocol to describe the invention. The links that connect the different routers include a variety of physical media, such as Ethernets, token rings or serial lines.

A network service provider administers the operations of the core network 101. Within this core network, different parts of the network have a different amount of traffic utilizations. Portions of the network may be loaded quite heavily, while other portions of the network would not be loaded that heavily. The network service provider knows the amount of traffic that needs to be transported across different access routers.

In a typical operation of the network, the network operator administering the core network 101 has an estimate of the traffic that is needed between pairs of access routers. The network operator uses these estimates to determine the speed of the links which are likely to result in a good performance of the network. This determination is done before the network becomes operational. However, once the network is operational, packets are routed according to IP conventions. IP requires that a packet be forwarded based on its destination IP address. The next hop router to be traversed for a specific destination address is determined by means of a routing protocol in IP. A commonly deployed routing protocol is OSPF. OSPF typically chooses the shortest path in the network between a source and the destination. Other routing protocols choose paths based on a different set of weights assigned to different links. Such weights may depend on several factors, such as the speed of the links, the current utilization of the links etc.

Figure 2:
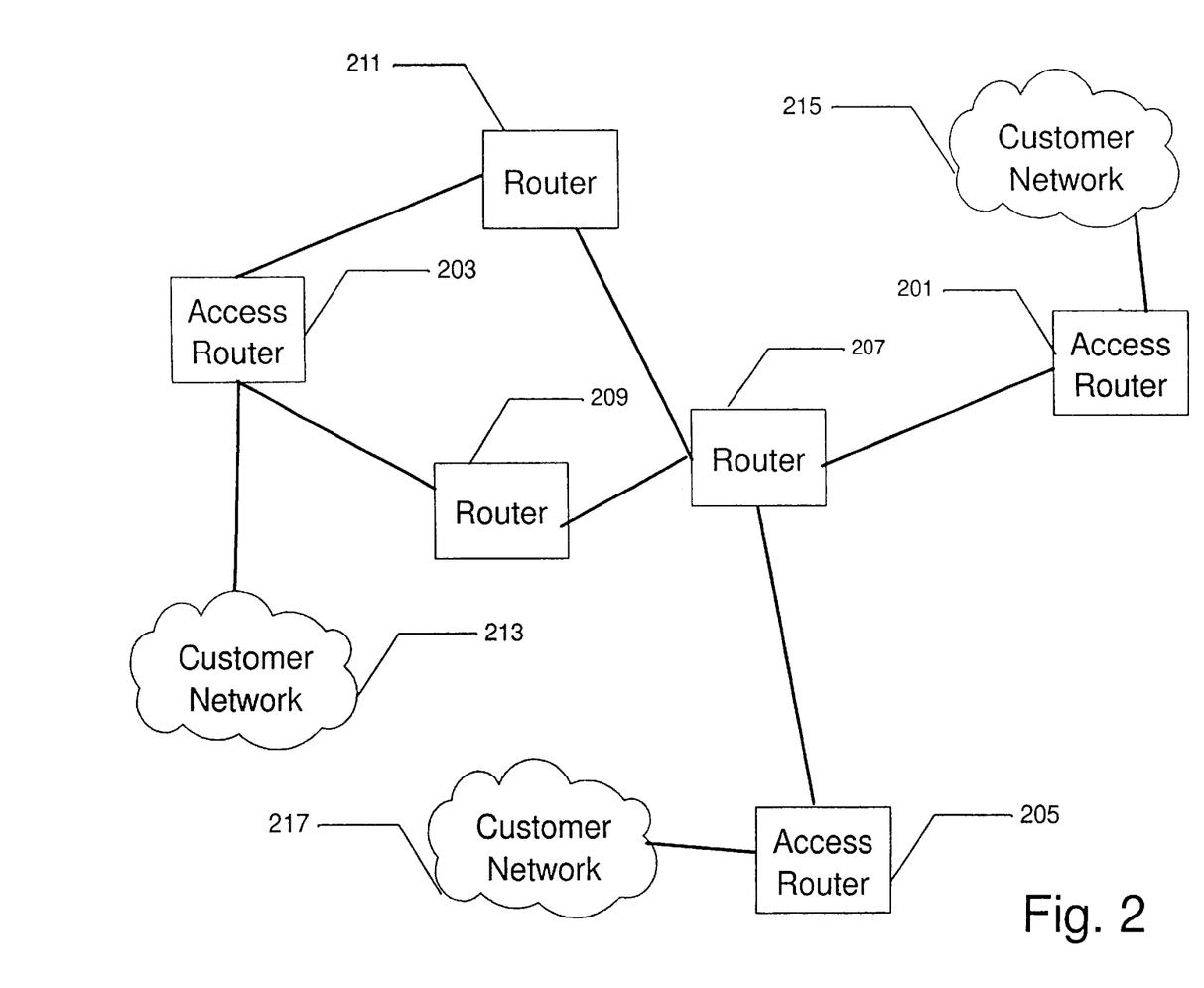
FIG. 2 is a block diagram illustrating a traffic engineering problem in the network.

Regardless of how routing protocols determine the paths, each IP router will forward packets on the basis of destination IP addresses. As a result, the network operator has very little control over determining how IP packets will be routed (apart from the selection of the routing protocol). This can lead to an unbalanced utilization of the links in the core network. FIG. 2 illustrates such a problem that can arise in the core network.

FIG. 2 illustrates a portion of the core network which interconnects three access routers 201, 203 and 205. The portion of the core network shown includes three routers 207, 209 and 211. Let us assume that all links which connect the different routers are capable of carrying an equal capacity of traffic, e.g., 1.5 Mbps. The customer network 213 is connected via the access routers 203. The network operator assumes that the amount of traffic that is destined for customer network 213 behind the access router 203 consists of 1 Mbps from the customer network 215 behind access router 201, and 1 Mbps from the customer network 217 behind access router 205. Let us further assume that the routing protocols for IP determines that the optimum path for packets headed towards customer network 213 is to take router 207 as the next hop at the access routers 203 and 205, and to take router 209 as the next hop at the router 207, and access router 201 at the router 209. In this case, the packets on the link between router 207 and router 209 form a traffic of 2.0 Mbps. This will cause significant overload on the link, resulting in high packet drops and poor performance of the network. An alternate path in the network from the router 207 to the access router 201 exists, namely via the router 211. This alternate path may have sufficient bandwidth to accommodate half of the packets flowing through the network. However, with existing IP routing techniques, it is difficult to route the packets along different routes.

Figure 3:
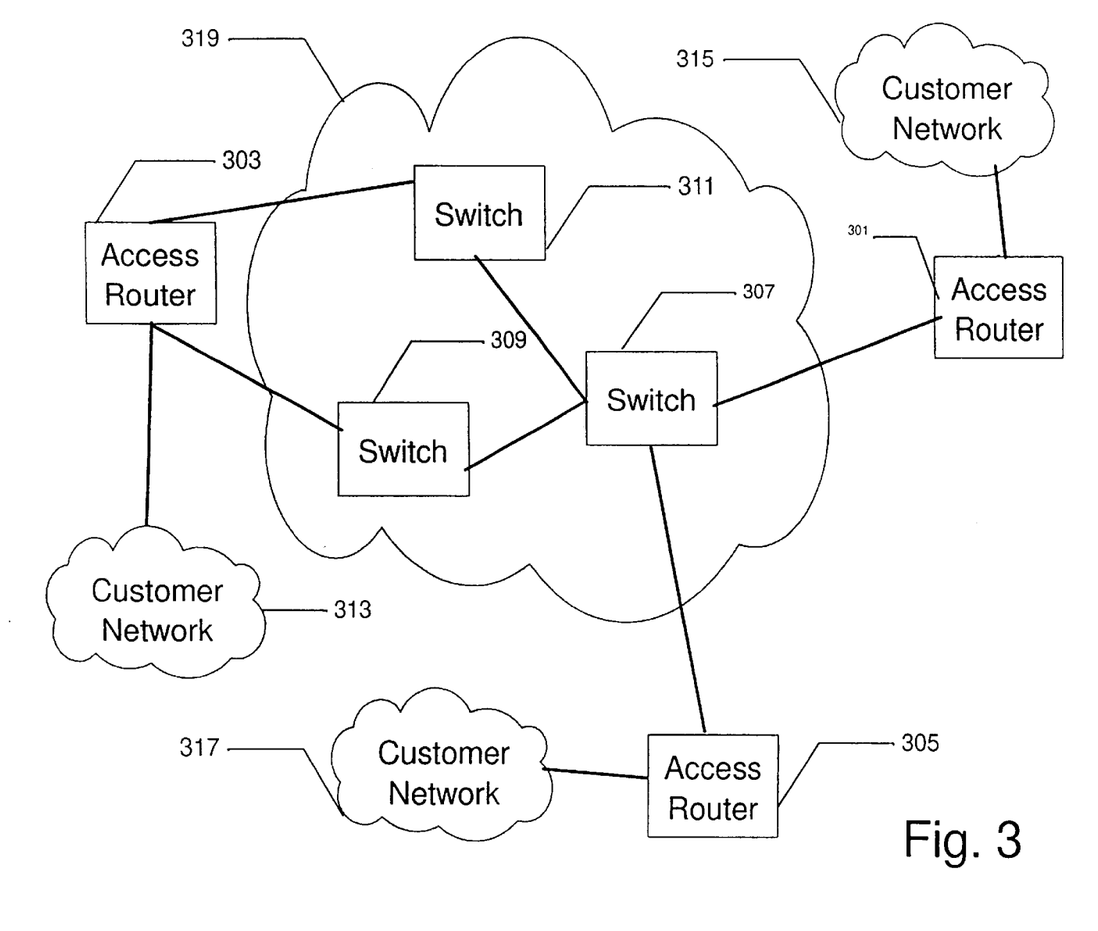
FIG. 3 is a block diagram that illustrates the conventional methods for supporting traffic engineering in an IP network.

In order to work around the single destination-oriented routing approach in IP networks, many network operators choose to operate IP networks as an overlay over a connection-oriented network. The connection-oriented overlay model is shown in FIG. 3. In this model, the routers 207, 209 and 211 are replaced by switches 307, 309 and 311 that support a connection-oriented networking paradigm, e.g., Frame Relay or ATM. The switches constitute the connection oriented core 319 of the network. The access routers 301, 303 and 305 encapsulate IP packets into the connection oriented network format, fragmenting them if necessary. A separate connection can be established for packets flowing from the customer network 315 to customer network 313, and from packets flowing from the customer network 317 to customer network 313. The first connection can be routed via the sequence of switches 301, 307, 309, 303 while the other can be routed via the sequence of switches 303, 307, 311, 303, thereby avoiding the overload on any of the links.

While the use of a connection-oriented paradigm may solve the traffic engineering problem, it requires that another set of protocols be used within the core network. This approach therefore makes it difficult to use fast hardware such as Gigabit Ethernets which can be used to interconnect the switches or routers in the core network. As a result, this solution is likely to be more expensive. Furthermore, the operators of the network needs to support two types of networking infrastructure, one based on the IP protocol which provides connectivity to the customers, and one based on the connection oriented paradigm used in the core network (e.g., ATM or Frame Relay). The operation of the two networks requires having support staff trained in two separate protocols, with the higher costs of training and development associated with maintaining skills in two different set of protocols.

The present invention includes a method and apparatus to achieves traffic distribution, (such as that illustrated in FIG. 3,) while only using a connectionless (e.g., the IP) networking protocol in the core routers. This is obtained using special processing performed by the access routers, and by using a route-server machine deployed in the network. An example of a scheme to perform traffic engineering in this fashion is illustrated in FIG. 4.

Figure 4:
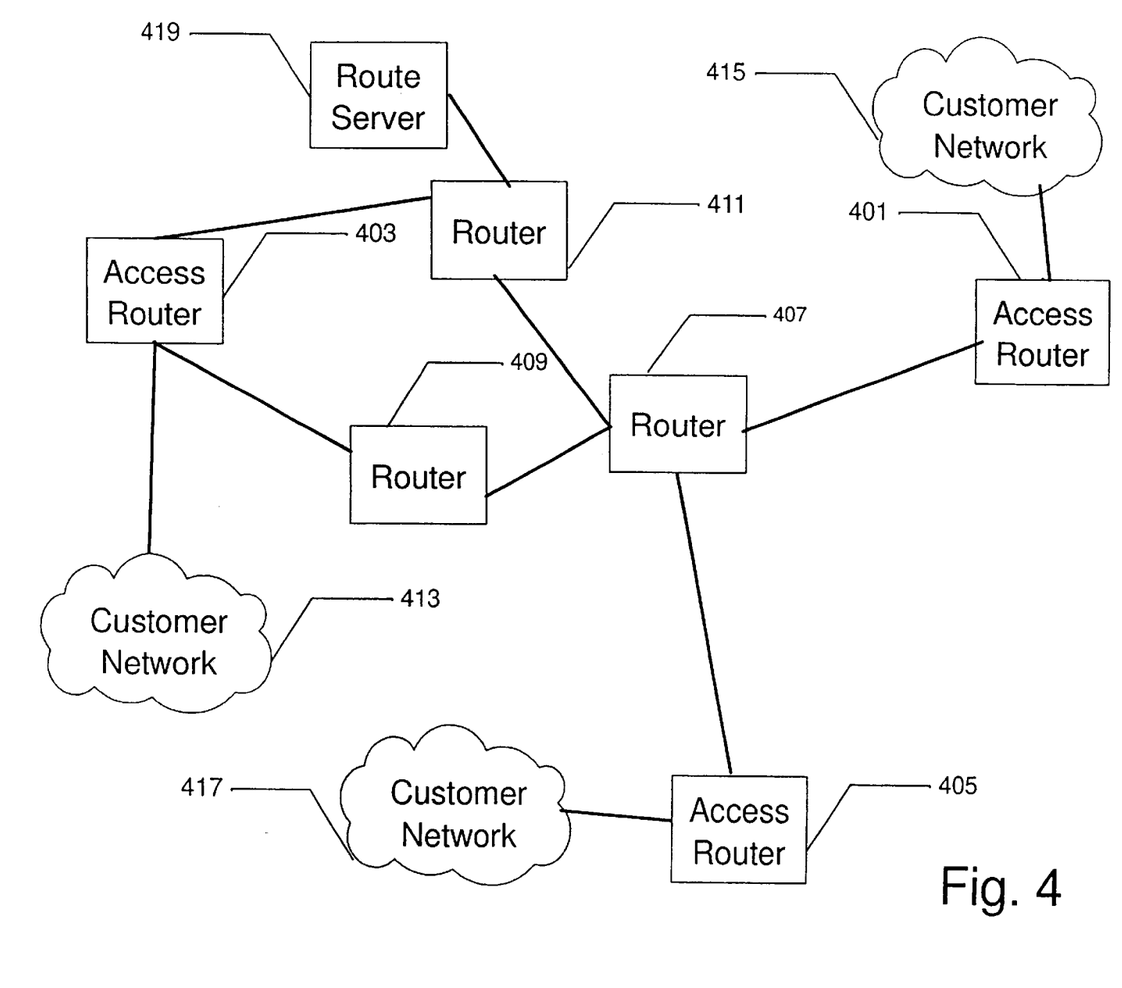
FIG. 4 is a block diagram illustrating an example a solution to the traffic engineering problem in accordance with the present invention.

FIG. 4 shows three access routers 401, 403 and 405 which obtain routing information from a router server 419. The route server assigns different virtual IP networks to each of the access routers which lie behind the access routers. In order to permit two different paths to the IP network 413 which is behind the access router 403, two different virtual IP network addresses are assigned to the customer network 413. The first virtual IP network address assigned to the customer network 413 is used by the access router 405 to route its packets to the customer network 413. The second virtual IP network address is used by the access router 401 to route packets to the customer network 413. The route server configures the routers 407, 409 and 411 in the network so that packets using the first virtual IP network address are routed through the sequence of routers 405, 407, 409 and 403 while the packets using the second virtual IP network address are routed through the sequence of routers 401, 407, 411 and 403.

In order for the core routers 407, 409 and 411 to process and route the packets correctly, the access routers which first receives the packet needs to modify the IP packets so that they contain the virtual address assigned to the final customer network. The egress router has the responsibility of recreating the original IP packet from the packet it receives. This procedure can be performed in one of the two manners: (i) by using IP in IP encapsulation or (ii) by using network address translation.

In the example of FIG. 4, suppose that the two network address of the customer network 413 is 200.0.0.0/8. The virtual network address 200.0.0.0/8 is the convention used in the state of the art to denote a network whose IP addresses contains the address 200.0.0.0, and all of whose IP addresses only differ from the address 200.0.0.0 in the last 8 bits of the address, i.e. the network which contains the IP addresses 200.0.0.0 through 200.0.0.255. Let us assume that the virtual IP network addresses assigned to the customer network 413 for the purpose of traffic engineering are 190.0.0.0/8 and 210.0.0.0/8. Consider a packet which is destined for the IP address 200.0.0.36 which is in the customer sub network 413. When such a packet is received by the access router 405, it uses an IP address within the network 190.0.0.0/8 to forward the packet in the resulting network. When such a packet is received by the access router 401, it uses an IP address within the network 210.0.0.0/8 to forward the packet.

The route server 419 configures the routing information in the core routers 407, 409 and 411 in the following fashion:

Router 407 forwards all packets destined for network 190.0.0.0/8 to router 409, and all packets destined for network 210.0.0.0/8 to router 411.

Router 411 forwards all packets destined for network 210.0.0.0/8 to router 409.

router 409 forwards all packets destined for networks 210.0.0.0/8 or 190.0.0.0/8 to access router 403.

Figure 5:
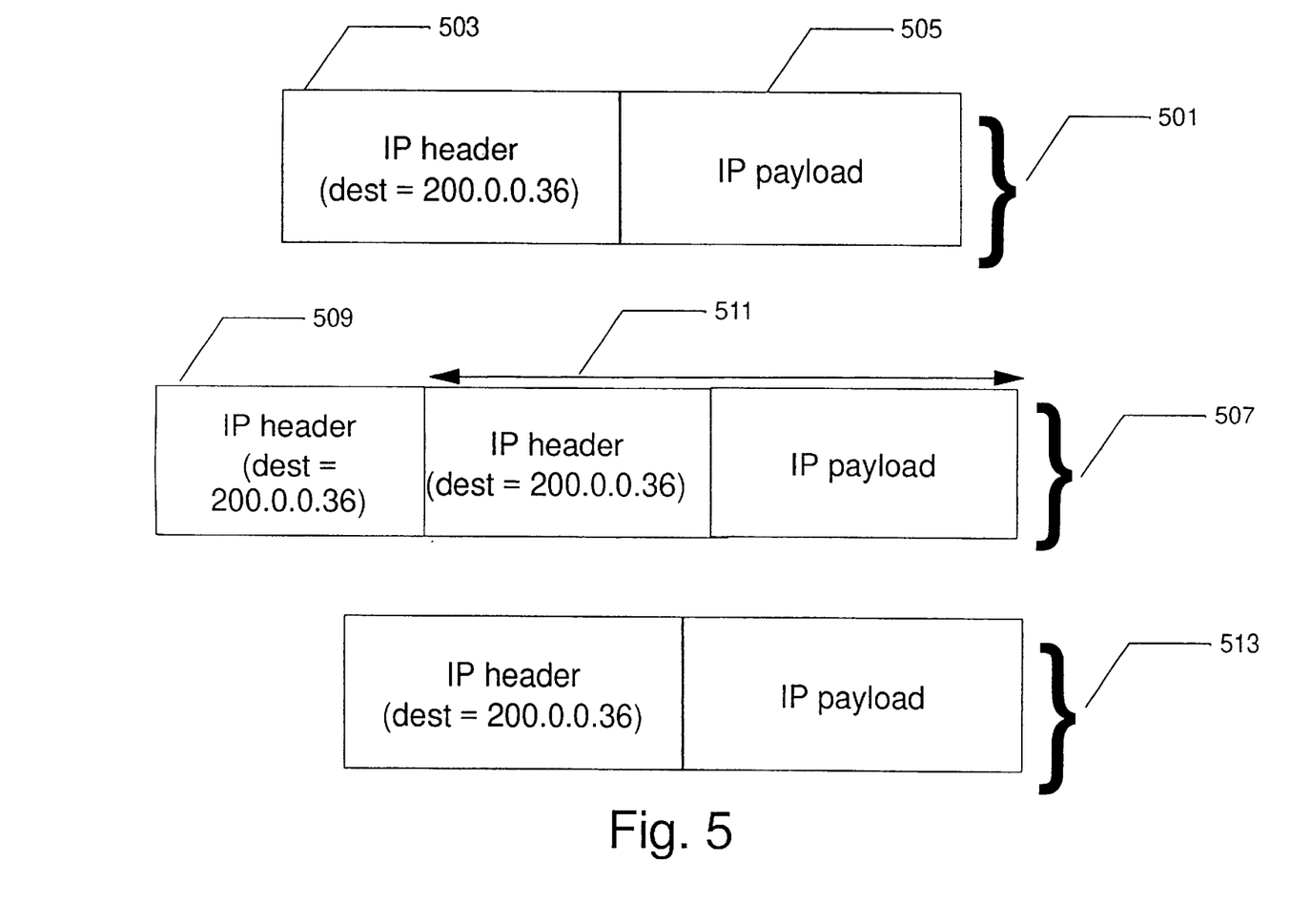
FIG. 5 is a block diagram illustrating an example transformation of IP packets as they traverse the network using an IP-in-IP encapsulation scheme as part of the solution shown in FIG. 4.

Let us assume that a technique of IP-in-IP encapsulation is used to forward IP packets by the access routers 401 and 405. In that case, the original packet is transformed as illustrated in FIG. 5. The original IP packet 501 which is received by the access router 405 includes an IP header 503 and an payload 505. The IP header 503 contains an destination address of 200.0.0.36. When the access router 401 receives the packet, it transforms the packet into another IP packet 507. The IP packet 507 is forwarded by the access router 401 to the router 409. The IP packet 507 contains an outer IP header 509 which contains the destination address of 190.0.0.36 (or any other address within the network 190.0.0.0/8), and a payload 511 which is identical to the original IP packet 501. Because of the configuration of the routers in the network, packet 507 is routed along the desired sequence to routers to access router 403. The access router 403 extracts the payload from the packet 507 to create a packet 513 which is identical in contents to the original packet 501.

Figure 6:
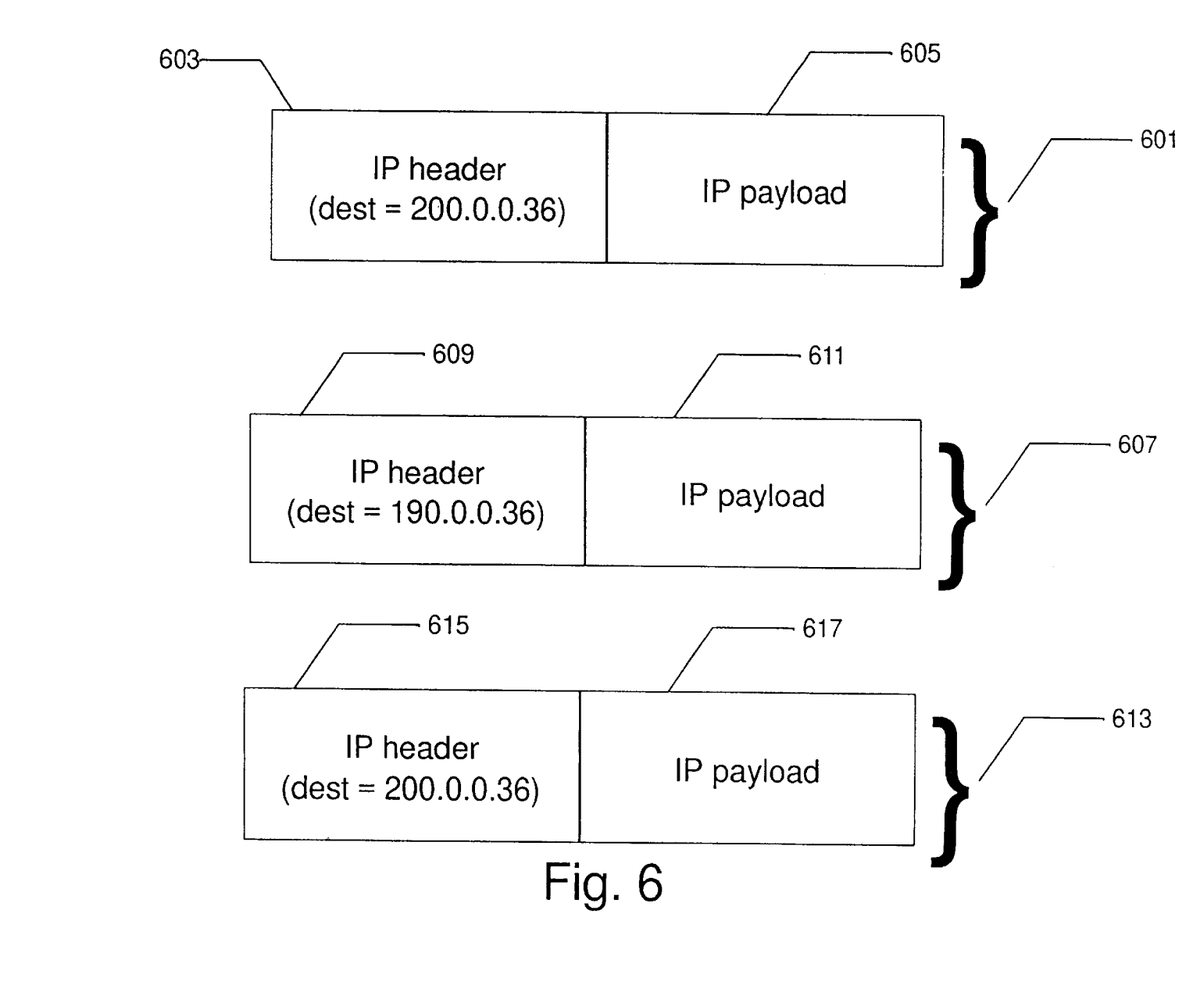
FIG. 6 is a block diagram illustrating an example the transformation of IP packets as they traverse the network using an IP-in-IP encapsulation scheme as part of the solution shown in FIG. 4.

In an alternate embodiment, network address translation is used to control routing in the core network. In this case, the packets are transformed in a somewhat different manner. An example of the transformation is illustrated in FIG. 6.

The original IP packet 601 includes a IP header 603 and a payload 605. The IP header 603 contains an destination address of 200.0.0.36. When the access router 401 receives the packet, it transforms the packet into another IP packet 607. The IP packet 607 includes an IP header 609 and a payload 611. The payload 611 is identical to payload 605. However, the destination address in the IP header 609 is obtained by combining the virtual subnet address 190.0.0.0/8 and the host address part of the original IP address, which the last byte 36. Thus the IP header contains the destination address of 190.0.0.36. When the IP packet 607 is received by the access router 403, it obtains the original datagram by extracting the host part in the destination address 190.0.0.36 (namely the last byte 36) and then combining it with the real network address of 200.0.0.0/8 to obtain the IP destination of 20.0.0.36. This results in the creation of the IP packet 613 which contains an IP header 615 with the destination address of 20.0.0.36 and a payload of 617, which is identical to the payload 611. The packet 613 is identical to the packet 601, with the exception of those parts of IP header which are modified in the course of normal IP processing.

Figure 7:
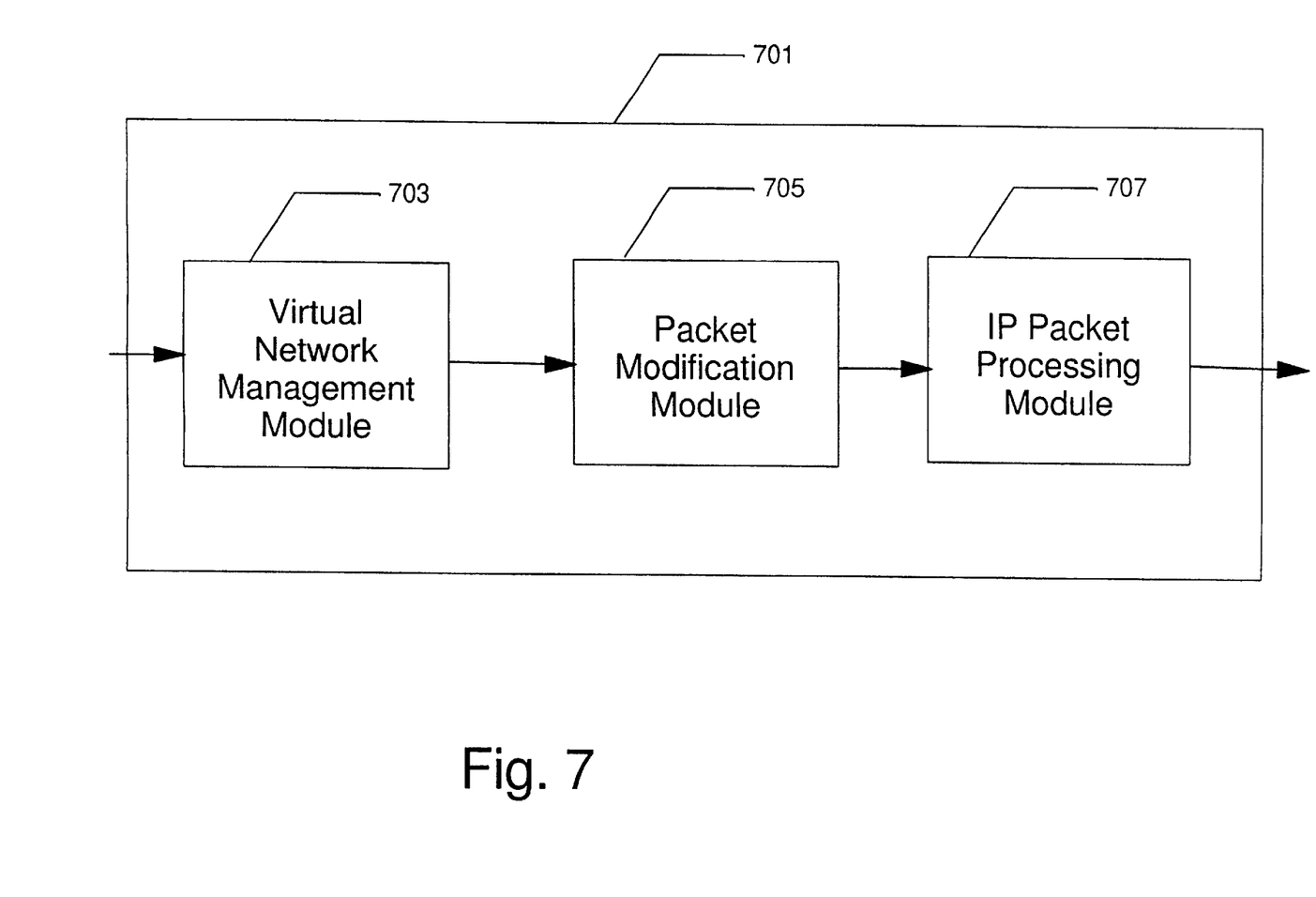
FIG. 7 is a block diagram showing an example of a structure of an access router, a component of the proposed solution to the traffic engineering problem.

FIG. 7 illustrates the structure of an access router 401, 403, 405 required to support this invention. The access router 701 includes a virtual network management module 703, a packet modification module 705, and an IP packet processing module 707. For an IP packet which is headed towards the core network from a customer network, the virtual network management module 703 determines the virtual network to which a packet belongs while the packet modification module 705 modifies packets to use virtual network addressed in the core network using one of the schemes illustrated in FIGS. 5 and 6. The IP packet processing module 707 handles the packets output by the packet modification module 705 in the manner specified by the IP protocol standards. For an IP packet which is headed towards a customer network from the core network, the virtual network management module 703 determines the original IP address to which a packet belongs while the packet modification module 705 recreates the original packet using one of the schemes illustrated in FIGS. 5 and 6. The IP packet processing module 707 handles the packets output by the packet modification module 705 in the manner specified by the IP protocol standards.

Figure 8:
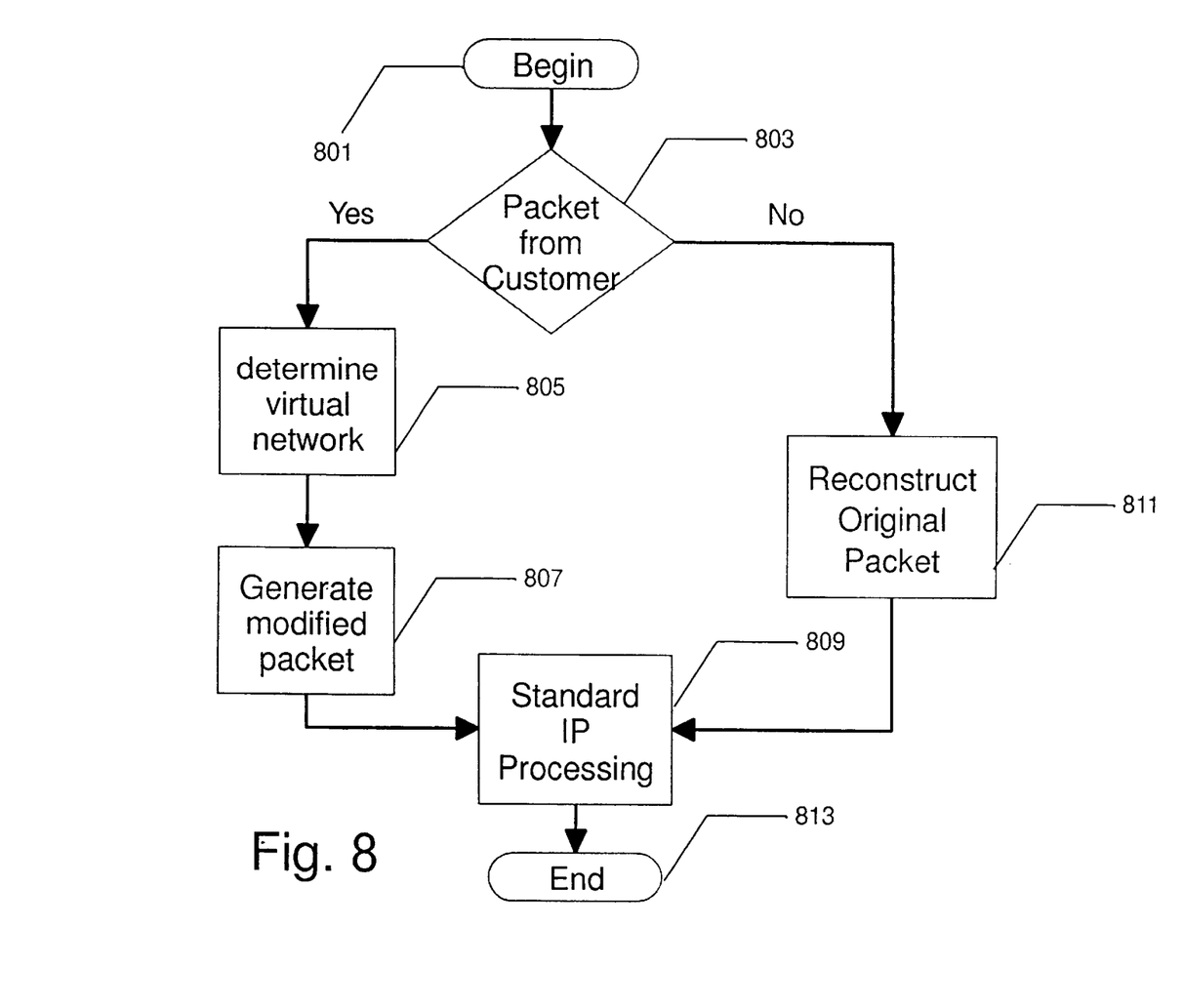
FIG. 8 is a flow diagram showing an example of steps performed by an access router to process an IP packet in the network in accordance with the present invention.

FIG. 8 shows an example of the steps of a method executed by an access router in accordance with the present invention. The method starts in step 801 when an IP packet is received by the access router. In step 803, a check is made to determine upon which interface the packet arrived. If the packet arrived from the customer network, the method determines the virtual network address to be used for the transport of the packet in step 803. After this, the method modifies the packet using one of the two schemes described in FIGS. 5 and 6 in step 805. Subsequently, the method performs standard IP processing and forwarding in step 807, and terminating in step 813. If as the result of the check in step 803, the packet is determined to be coming from the core network, the method reconstructs the original customer's packet in step 811, subsequently performing normal IP forwarding in step 807. The method terminates in step 813.

Figure 9:
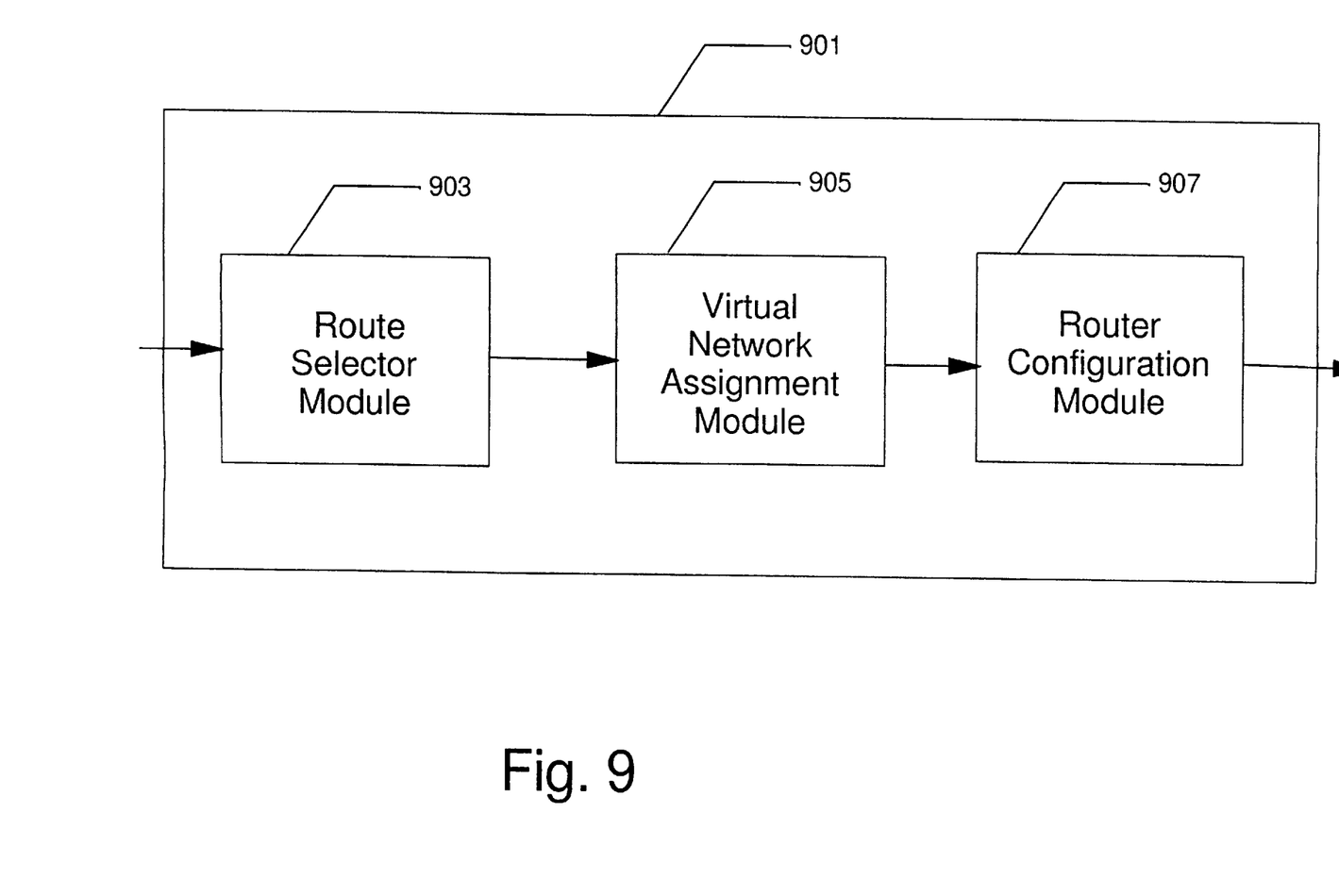
FIG. 9 is a block diagram showing an example of a structure of a route server, a component of the proposed solution to the traffic engineering problem in accordance with the present invention.

FIG. 9 illustrates an example of a structure of a router server 901 as used in an embodiment of this invention. The router server 901 includes a route selector module 903 to determine the route to be taken by packets that are destined for a specific destination, a virtual network assignment module 905 which assigns virtual network addresses to subnets behind different access routers if it is required, and a router configuration module 907 which is used to modify routing tables and configuration in the core network routers and access routers. When there is a need to send specific amount of traffic between a pair of access routers is required, the route selector module 903 determines the best route to take in the network. If the network route selected by the route selector module 903 differs from the path that traditional IP routing will take, the virtual network address assignment module determines a new virtual network address to be used for packets to be routed along the different path. The router configuration module 907 configures the various access routers and core network routers to support the specific route.

Figure 10:
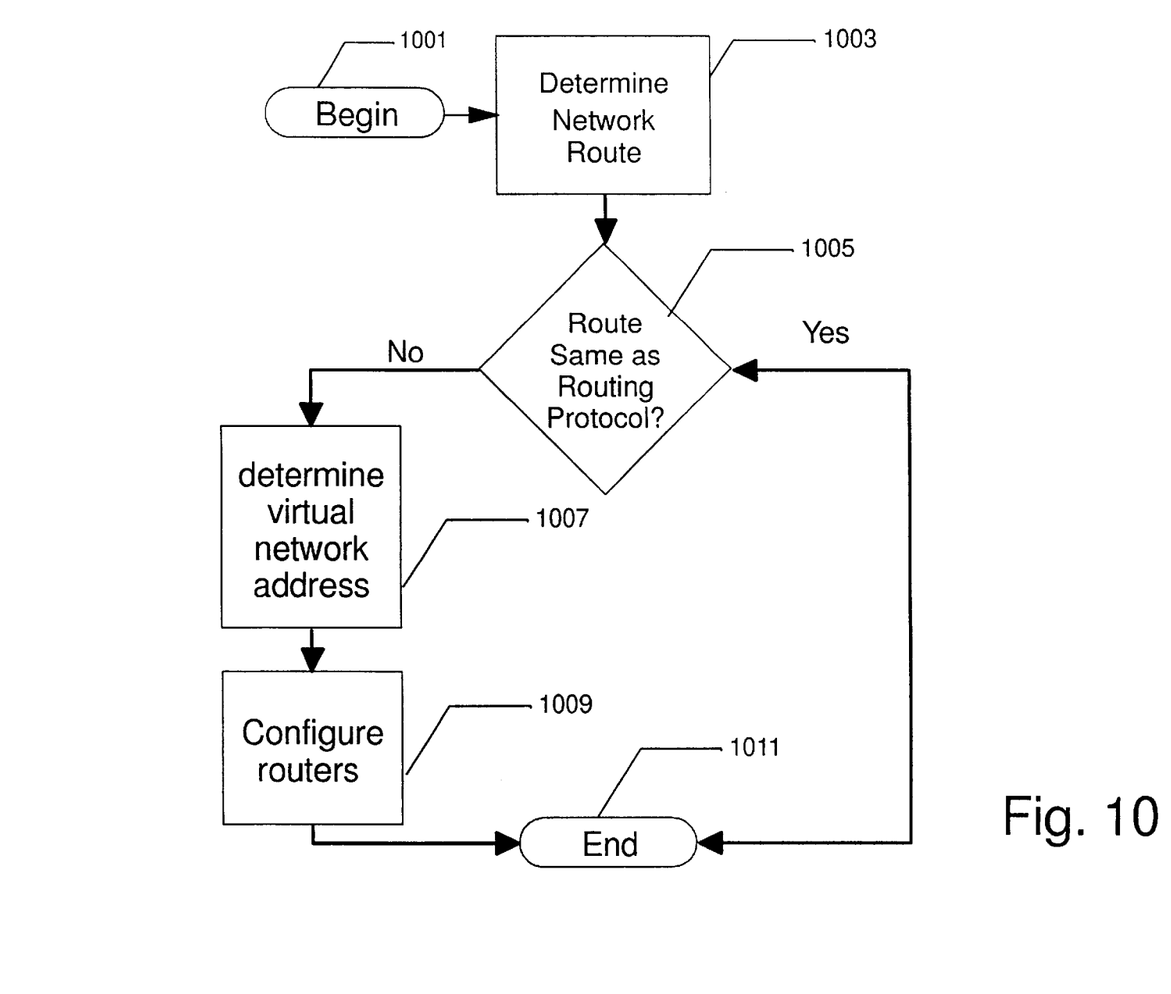
FIG. 10 is a flow diagram illustrating an example algorithm for managing traffic flows that can be used by the router server in accordance with the present invention.

FIG. 10 shows an example of a method executed by the route server in order to support traffic engineering in an IP network. The method starts in step 1001 when a new flow of packets needs to be rerouted along a specific desired path. In step 1003, the best path to direct the flow of packets is determined. Several algorithms to compute such a path are well known in the state of the art. In step 1005, the method checks if the best path selected is indeed the path that would be taken by deployed routing protocol (e.g., OSPF) for the IP network. If so, the method exits in step 1011. Otherwise, if the path to be taken by the packets differs from the deployed routing protocol, a virtual subnet address which is not already in use at the destination access router is determined in step 1007. In step 1009, the different access routers and routers are configured to use the new virtual subnet address for the purpose of transformation at the access routers, and for the routing of core routers and access routers.

It is noted that the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. For example, the invention is applicable to any connectionless protocol. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described my invention, what I claim as new and desire to secure by Letters Patent is as follows:

1. A method for traffic engineering in a network of connectionless routers supporting a connectionless protocol, said method comprising the steps of:
   assigning a plurality of different virtual network addresses to at least one network access router from among said connectionless routers;
   assigning a different route for each of said plurality of different virtual network addresses in a core network; and
   forwarding packets to the at least one network access router along different routes in the core network using the virtual network addresses.

2. A method as recited in claim 1, wherein the step of forwarding comprises:
   determining a virtual destination address for at least one original packet from among said packets at an ingress access router;
   creating a modified packet containing the virtual destination address at the ingress access router; and
   reconstructing the original packet at an egress access router.

3. A method as recited in claim 1, further comprising establishing separate routes for different virtual networks by sending routing messages for the virtual networks.

4. A method as recited in claim 1, further comprising establishing separate routes for different virtual destinations by means of a routing server.

5. A method as recited in claim 2, wherein:
   the step of creating a packet includes encapsulating the original packet into an external header containing the virtual destination address; and
   the step of reconstructing the original packet includes decapsulating the original packet from the external header at the egress access router.

6. A method as recited in claim 5, wherein the external header is an external IP header.

7. A method as recited in claim 2, wherein:
   the step of creating a packet includes replacing part of the destination address in the original packet with the virtual network address; and
   the step of reconstructing the original packet includes replacing part of the destination address in the packet at the egress access router.

8. A method as recited in claim 1, wherein the connectionless router is an IP router.

9. An article of manufacture comprising a computer usable medium having computer readable program code means embodied therein for causing traffic engineering in a network of connectionless routers supporting a connectionless protocol, the computer readable program code means in said article of manufacture comprising computer readable program code means for causing a computer to effect the steps of claim 1.

10. An article of manufacture as recited in claim 9, wherein the step of forwarding comprises:
    determining a virtual destination address for at least one original packet from among said packets at an ingress access router;
    creating a modified packet containing the virtual destination address at the ingress access router; and
    reconstructing the original packet at an egress access router.

11. An article of manufacture as recited in claim 10, wherein:
    the step of creating a packet includes encapsulating the original packet into an external header containing the virtual destination address; and
    the step of reconstructing the original packet includes decapsulating the original packet from the external header at the egress access router.

12. An article of manufacture as recited in claim 9, wherein the connectionless protocol is IP.

13. A computer program product comprising a computer usable medium having computer readable program code means embodied therein for causing traffic engineering in a network of connectionless routers supporting a connectionless protocol, the computer readable program code means in said computer program product comprising computer readable program code means for causing a computer to effect the steps of claim 1.

14. A program storage device readable by machine, tangibly embodying a program of instructions executable by the machine to perform method steps for causing traffic engineering in a network of connectionless routers supporting a connectionless protocol, said method steps comprising the steps of claim 1.

15. An access router for implementing traffic engineering in a connectionless protocol network, said access router comprising:

a virtual network management module to determine a virtual network to which a packet belongs out of a plurality of virtual networks;

a packet modification module to modify packets to use virtual network addresses in a core network; and a packet processing module to process the packet along different routes in said core network for each of said virtual network addresses.

16. A route selector for implementing traffic engineering in a network having connectionless routers with connectivity of a connectionless protocol, said route selector comprising:

a route selector module to determine a route to be taken by the network to which a packet belongs;

a virtual network assignment module to assign a plurality of virtual network addresses to at least one access router; and a router configuration module to modify routing tables and configuration in the connectionless routers, in accordance with assignments made by the virtual network assignment module, so that the packet takes a different route through a core network for each of said virtual addresses.

17. An access router for implementing traffic engineering in a connectionless protocol network, said access router comprising:

a plurality of different virtual network addresses for said access router, each of said virtual addresses representing a different route to said access router, through a core network;

a virtual network management module to determine an original network address to which a modified packet directed to one of said virtual network addresses belongs;

a packet modification module to recreate an original packet from the modified packet; and a packet processing module to process the packet so that the packet is directed to the original network address.

* * * * *